(12) United States Patent
Sendlhofer et al.

(10) Patent No.: US 10,926,483 B2
(45) Date of Patent: Feb. 23, 2021

(54) VACUUM FIXTURE

(71) Applicant: NCR Corporation, Atlanta, GA (US)

(72) Inventors: Gerhard Sendlhofer, Kuchl (AT); Kristoffer Malone Bejemino, Lapu-Lapu (PH)

(73) Assignee: NCR Corporation, Atlanta, GA (US)

( * ) Notice: Subject to any disclaimer, the term of this patent is extended or adjusted under 35 U.S.C. 154(b) by 296 days.

(21) Appl. No.: 16/177,726

(22) Filed: Nov. 1, 2018

(65) Prior Publication Data

US 2020/0139639 A1 May 7, 2020

(51) Int. Cl.
| | |
|---|---|
| *B29C 65/00* | (2006.01) |
| *A47F 9/00* | (2006.01) |
| *B25B 11/00* | (2006.01) |
| *G06F 3/00* | (2006.01) |
| *G07G 1/00* | (2006.01) |
| *B29C 65/78* | (2006.01) |
| *A47F 9/04* | (2006.01) |
| *G06F 3/044* | (2006.01) |

(52) U.S. Cl.
CPC .......... *B29C 65/7847* (2013.01); *A47F 9/047* (2013.01); *B25B 11/005* (2013.01); *G06F 3/044* (2013.01); *G07G 1/0018* (2013.01); *A47F 2009/041* (2013.01); *G06F 2203/04103* (2013.01)

(58) Field of Classification Search
CPC ......... B29C 65/00; B29C 65/70; B29C 65/78; B29C 65/784; B29C 65/7847; A47F 9/00; A47F 9/04; A47F 9/047; B25B 11/00; B25B 11/005; G06F 3/00; G06F 3/04; G06F 3/044; G07G 1/00; G07G 1/001; G07G 1/0018
See application file for complete search history.

(56) References Cited

U.S. PATENT DOCUMENTS

| | | | | |
|---|---|---|---|---|
| 3,476,377 A | * | 11/1969 | Agrista | B25B 11/005 269/21 |
| 2015/0378492 A1 | * | 12/2015 | Rosenberg | G06F 3/016 345/174 |
| 2016/0280409 A1 | * | 9/2016 | Verma | B65D 33/007 |

* cited by examiner

*Primary Examiner* — Jacob T Minskey
*Assistant Examiner* — Matthew Hoover
(74) *Attorney, Agent, or Firm* — Schwegman, Lundberg & Woessner

(57) ABSTRACT

Disclosed is a vacuum fixture. The vacuum fixture may include a base plate assembly, a middle frame assembly, and a top plate assembly. The base plate assembly may have a first hinged edge. The middle frame assembly may be connected to the base plate proximate the first hinged edge and may define a void. The top plate assembly may have a second hinged edge connected to the first hinged edge, such that when the top plate assembly is in a closed position the middle frame assembly is located in between and contacts a first surface of the base plate assembly and a first surface of the top plate assembly, thereby forming a cavity in between the base plate assembly and the top plate assembly.

20 Claims, 4 Drawing Sheets

VACUUM FIXTURE

SUMMARY

Disclosed is a vacuum fixture. The vacuum fixture may include a base plate assembly, a middle frame assembly, and a top plate assembly. The base plate assembly may have a first hinged edge. The middle frame assembly may be connected to the base plate proximate the first hinged edge and may define a void. The top plate assembly may have a second hinged edge connected to the first hinged edge, such that when the top plate assembly is in a closed position the middle frame assembly is located in between and contacts a first surface of the base plate assembly and a first surface of the top plate assembly, thereby forming a cavity in between the base plate assembly and the top plate assembly.

BRIEF DESCRIPTION OF THE FIGURES

The above-mentioned and other features and advantages of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the invention, and such exemplifications are not to be construed as limiting the scope of the invention any manner.

DETAILED DESCRIPTION

Figure 1:
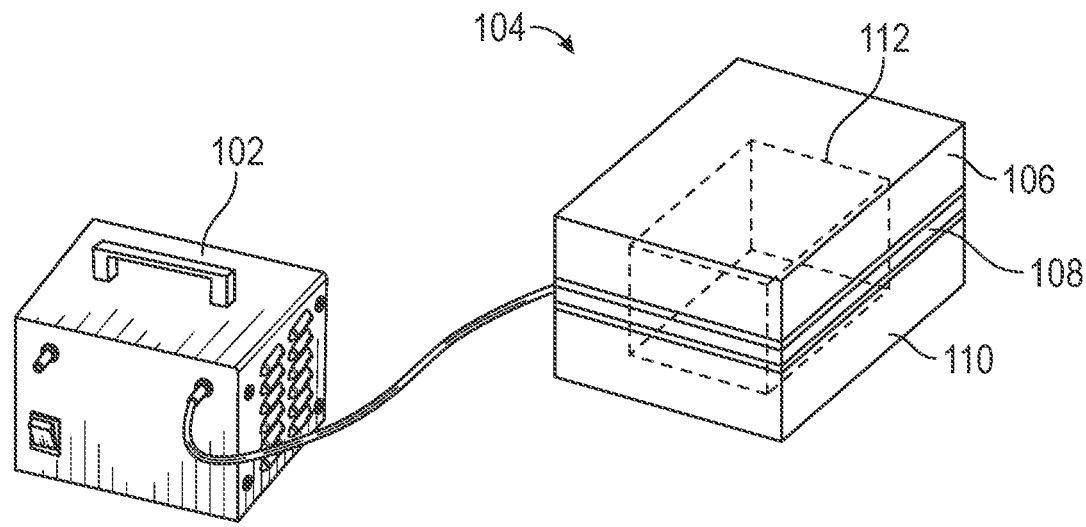
FIG. 1 shows an example schematic of a vacuum system consistent with this disclosure.

The following detailed description refers to the accompanying drawings. Wherever possible, the same reference numbers are used in the drawings and the following description to refer to the same or similar elements. While embodiments and examples are described, modifications, adaptations, and other implementations are possible. For example, substitutions, additions, or modifications may be made to the elements and stages illustrated in the drawings, and the systems and methods described herein may be modified by substituting, reordering, or adding stages to the disclosed methods or elements to the discloses systems. Accordingly, the following detailed description does not limit this disclosure. Instead, the proper scope of any invention disclosed herein is defined by the appended claims.

Various self-service terminals (SST), such as self-checkout terminals (SCT) and automated teller machines (ATM), may use touch screen displays. One example includes a projected capacitive (PCAP) display. The display may be glued to a frame.

The vacuum fixture disclosed herein may enable precise positioning and improved gluing of a PCAP touchscreen display with a point of sale (POS) display frame within a short time, such as 3-5 minutes or less. The resulting display assembly can immediately be used for subsequent assembly steps. As a result, the vacuum assemblies disclosed herein may significantly decreases labor time.

The PCAP display assembly process may require very high bond (VHB) gluing of the POS display frame and/or cover glass and/or touch sensor panel. Such gluing processes frequently suffer multiple weaknesses. One weakness may be that the double-side adhesives, such as VHB tape used for gluing the PCAP to plastic carrier frames must be applied very precisely. Typically, within tight tolerances such as, 0.1 millimeter tolerance.

When pressing the PCAP display and the carrier frame together, many air bubbles may sprout inside and all over the area the VHB tape contacts. The air bubbles reduce the "wetting" (i.e., the percentage of surface area which is actually covered by glue), which can significantly reduce the bonding force. Without the systems and methods disclosed herein, operators may have to use pressing fixtures and tools like rubber rollers to "push out" the air bubbles. Even using the rollers, a large number of air bubbles frequently remain.

Using rollers and simply pressing the PCAP and frame together may require up to 72 hours to ensure a sufficient glue bonding strength despite the poor wetting. Thus, bonded parts need to be put aside for up to 72 hours, in order to gain an improved glue wetting. Only after the 72 hours may further assembly of the final POS unit proceed.

Due to the long set time, temporary stock space and cumbersome glue stock inventory may have to be maintained. This is both costly and poses risk as the displays may be damaged while awaiting installation in the final POS unit.

The vacuum assemblies disclosed herein realizes a simple to use fixture that ensures precise positioning of the parts-to-be-glued. In addition, they may reduce the number of fixtures from 3 or more to 1. In addition, the vacuum assemblies disclosed herein, may achieve better wetting and improved bonding between the PCAP display and carrier frame. For example, wetting or curing time of the VHB tapes from 72 hours down to 30 seconds may be realized. In addition, the vacuum assemblies disclosed herein may also allow for flexibility and may easily be implemented for different screen sizes and shapes.

As disclosed herein, vacuum assemblies may include a middle frame assembly that may be used to position the PCAP display and carrier frame. Upon closing a top plate assembly and a bottom plate assembly, a cavity may be form and the PCAP display and carrier frame may be located in the cavity. The air within the cavity may be evacuated forming a vacuum within the cavity. As the vacuum is formed the PCAP display and the carrier frame may be bonded together using VHB tape with minimal air bubbles and thus, improved wetting.

Turning now to the figures, FIG. 1 shows an example schematic of a vacuum system 100 consistent with this disclosure. As shown in FIG. 1, vacuum system 100 may include a vacuum pump 102 and a vacuum fixture 104. Vacuum fixture 104 may include a top plate assembly 106, a middle frame assembly 108, and a bottom plate assembly 110. Top plate assembly 106 and bottom plate assembly 110 may each define an interior space. Middle frame assembly 108 may define a through passage. Together, top plate assembly 106, middle frame assembly 108 and bottom plate assembly 110 may form a cavity 112.

As disclosed herein, during operation a PCAP display and carrier frame may be located within cavity 112. VHB tape may be placed on either the PCAP display or carrier frame. Once inside cavity 112, a vacuum may be pulled to evacuate the air from cavity 112. As the air is evacuated the carrier frame and PCAP display may be forced together as disclosed herein. Because the air has been evacuated from cavity 112, the chances of air bubbles forming at the interface between the PCAP display and carrier frame is minimized. Thus, upon removal of the PCAP display carrier frame assembly may be ready for using in assembling POS systems.

Figure 2A:
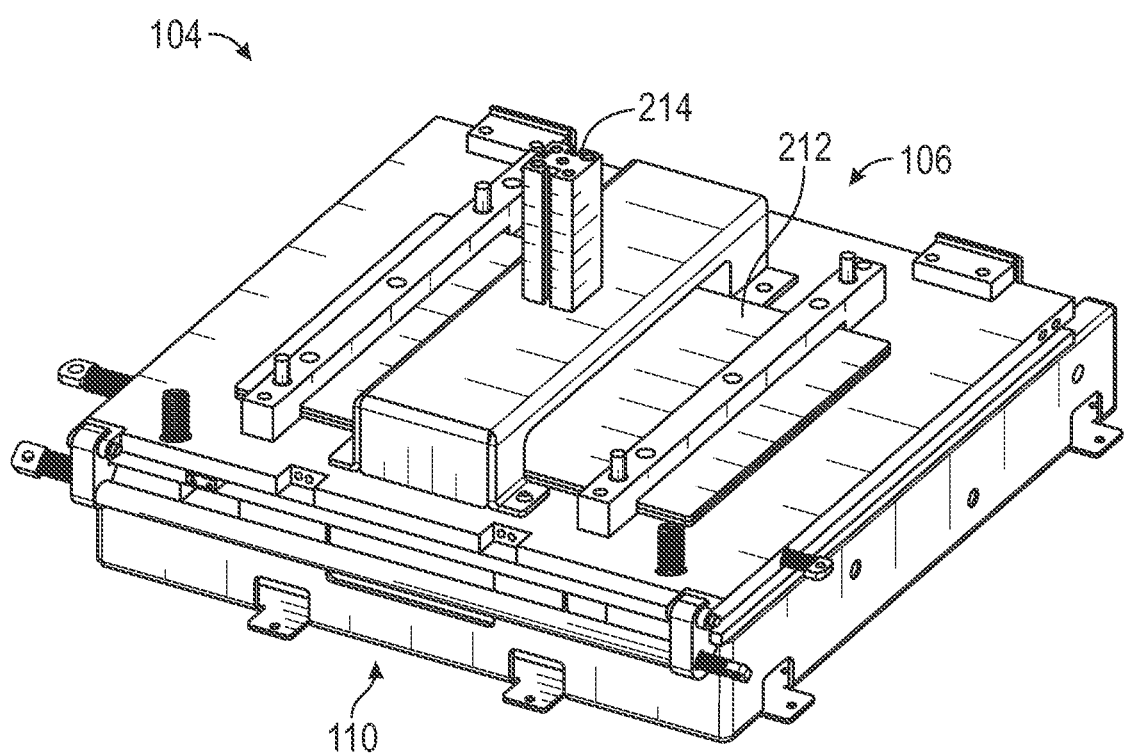
FIGS. 2A and 2B show an example vacuum fixture consistent with this disclosure.
Figure 2B:
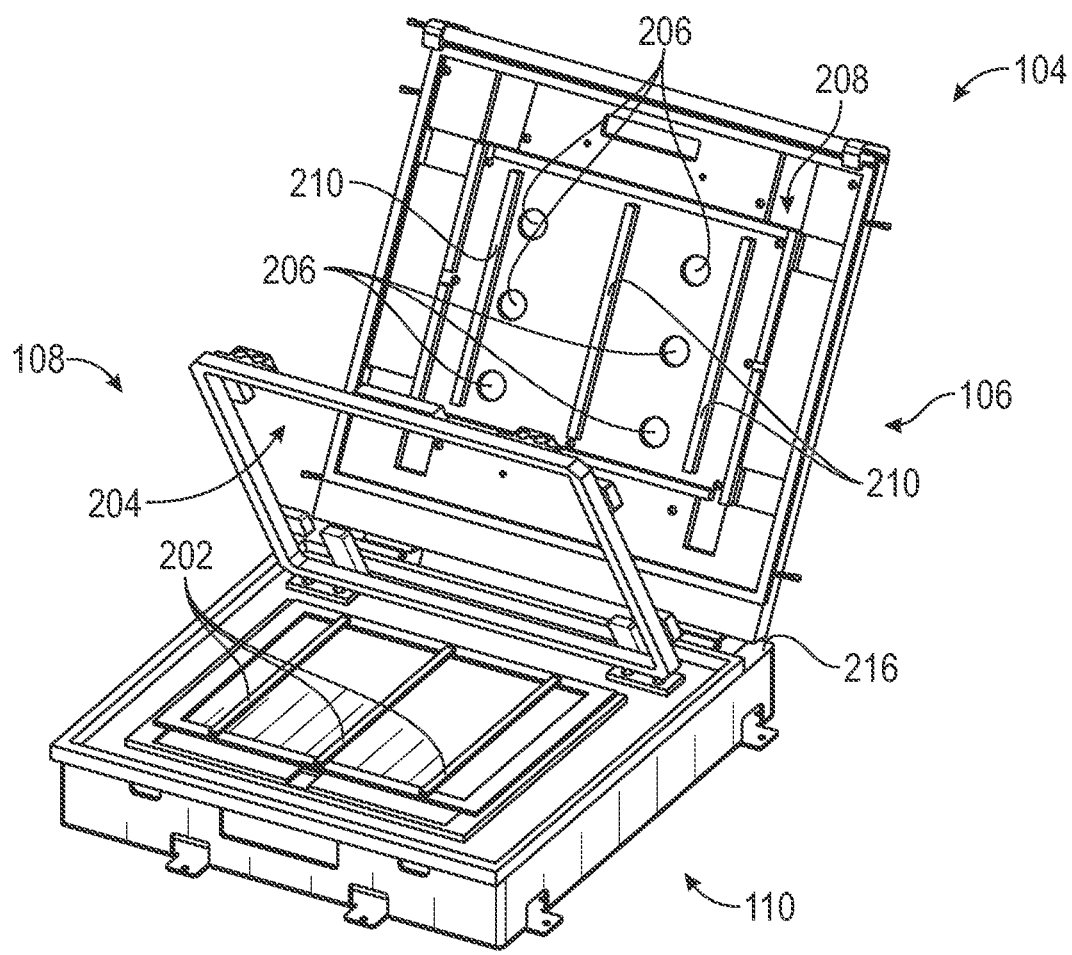

FIGS. 2A and 2B show vacuum fixture 104. FIG. 2A shows vacuum fixture 104 in a closed position and FIG. 2B shows vacuum fixture 104 in an opened position. As shown in FIG. 2B, bottom plate assembly 110 may include a plurality of spring loaded floats 202. Spring loaded floats 202 may support a PCAP display and carrier frame. Spring loaded floats 202 may provide a cushion upon which the PCAP display may rest such that when the carrier frame is pressed onto the PCAP display, the PCAP display does not get marred or other wised damaged by bottom plate assembly 110.

Figure 3:
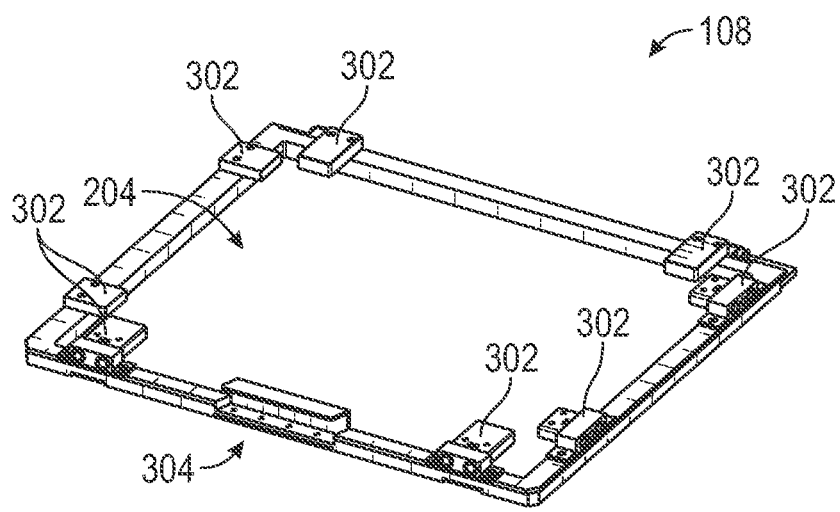
FIG. 3 shows a middle frame assembly consistent with this disclosure.

Middle frame assembly 108 may define an opening 204. As shown in FIG. 3, middle frame assembly 108 may include a plurality of locator clips 302. Locator clips 302 may be spring loaded such that each of locator clips 302 applies an even pressure to the PCAP display and/or carrier frame. As a result, locator clips 302 may cause the PCAP display and the carrier frame to become aligned and stay aligned during the bonding process. Locator clips 302 may be contoured so as to grip the PCAP display and/or carrier frame. In addition, middle frame assembly 108 may be one of a plurality of middle frame assemblies. As a result, vacuum fixture 104 may be used for different sizes of PCAP display and carrier frame combinations.

Middle frame assembly 108 may also include at least one vacuum port 304. Vacuum port 304 may allow vacuum fixture 104 to connect to vacuum pump 102. Stated another way, vacuum port 304 may provide an opening in vacuum fixture 104 such that the air can be evacuated from cavity 112. Vacuum port 304 may connect to one or more suction grippers 206. Suction grippers 206 may pass through a first surface 208 of top plate assembly 106. As a result, suction grippers 206 may be used to more evenly evacuate air from cavity 112.

Top plate assembly 106 may include one or more spring loaded floats 210. Spring loaded floats 210 may allow top plate assembly 106 to contact glass or other structures of the PCAP display or carrier frame without damaging them. For example, a top plate 212 may be sized to pass through or the tope of top plate assembly 106 may be deformable such that during evacuation of the air within cavity 112, top plate 212 may travel towards bottom plate assembly 110. A piston 214 may also press top plate 212 towards bottom plate assembly 110. As a result, as the air is evacuated from cavity 112, top plate 212 in combination with piston 214 may press the PCAP display and carrier frames together.

As shown in FIG. 2B, top plate assembly 106 may be connected to bottom plate assembly 110 via a hinge 216. Middle frame assembly 108 may also be connected to bottom plate assembly 110 via hinge 216 or via a separate hinge and be pivotable as shown in FIG. 2B.

Figure 4A:
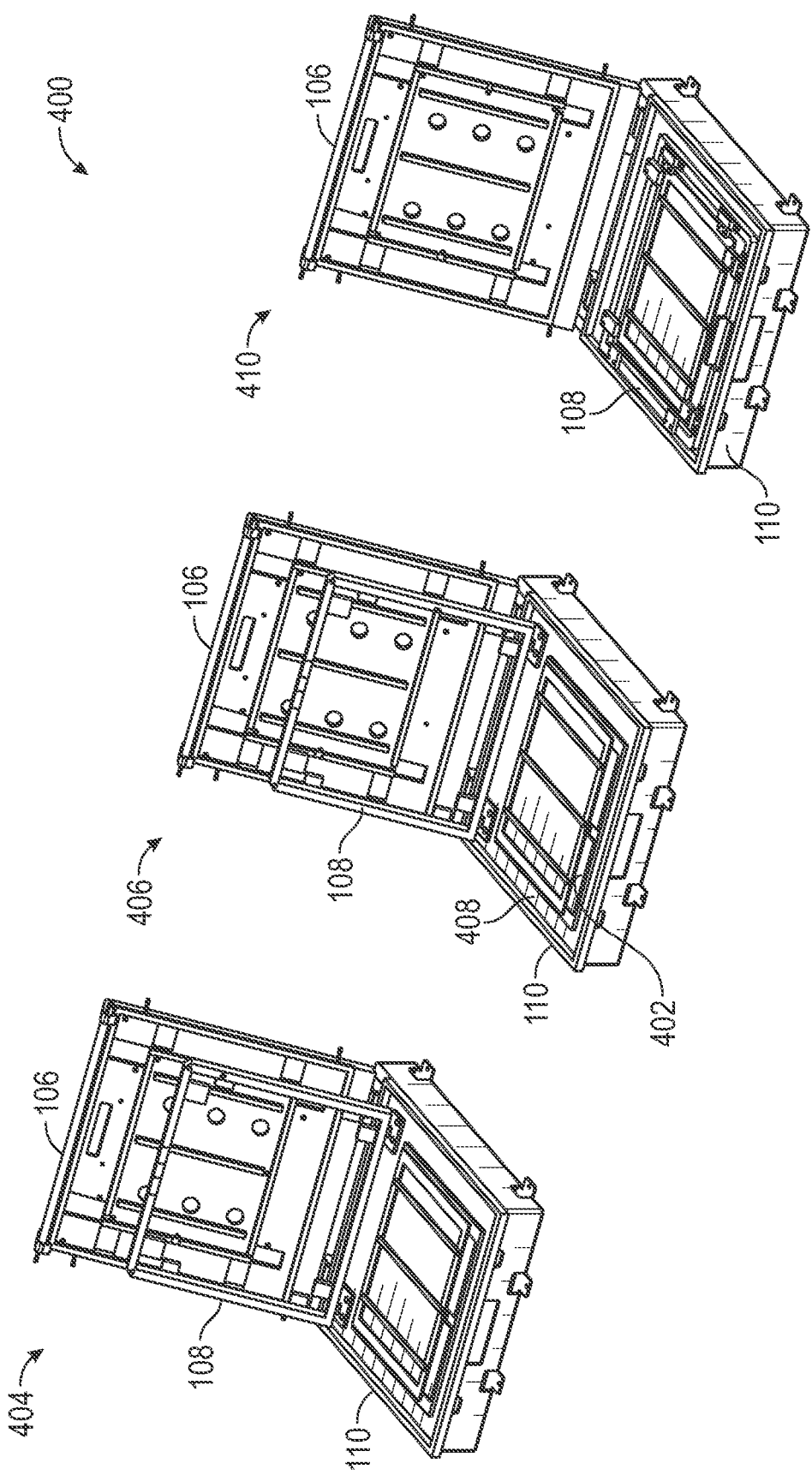
FIGS. 4A and 4B show an example method consistent with this disclosure.
Figure 4B:
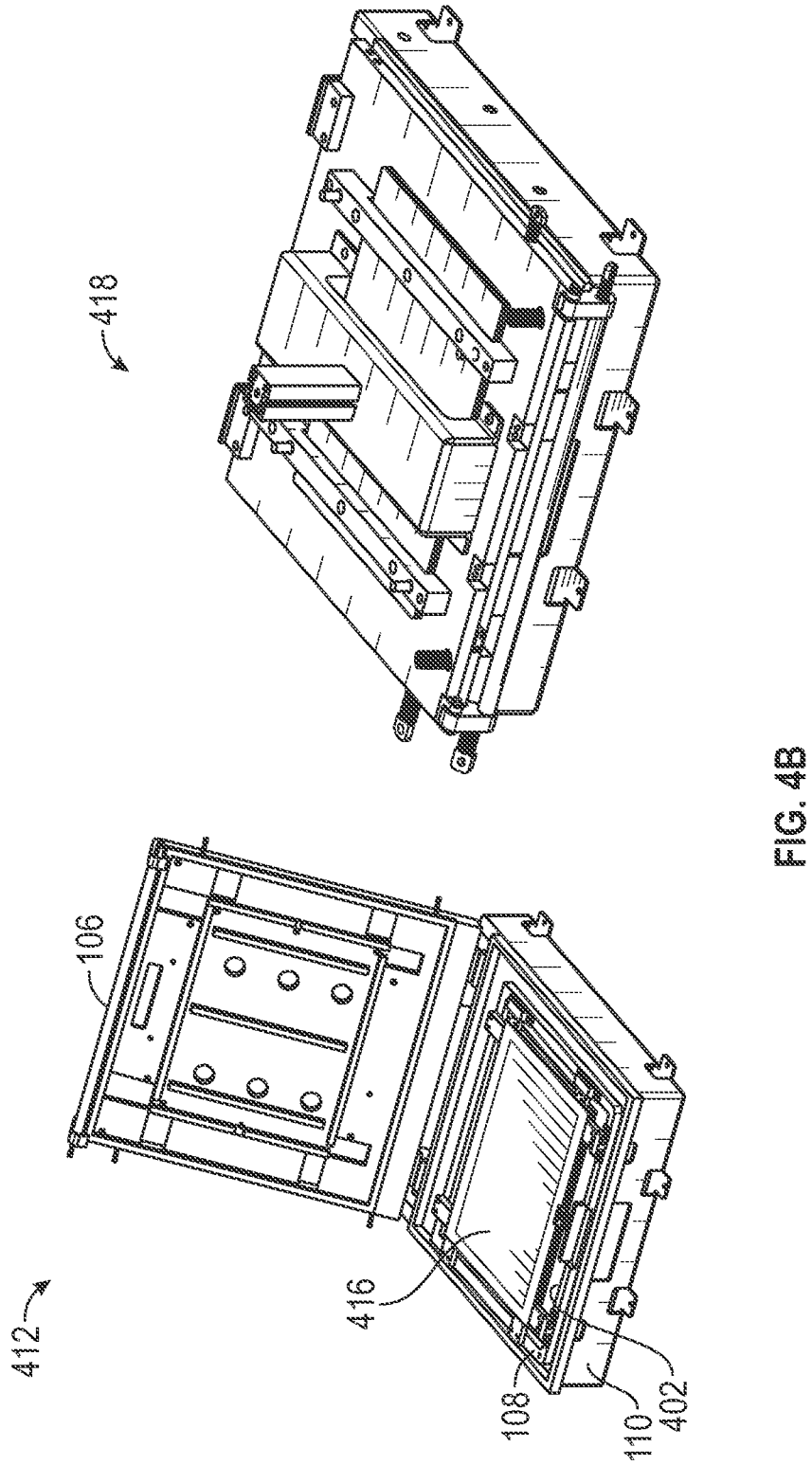

FIGS. 4A and 4B show a method 400 for fabricating a PCAP display assembly. Method 400 may begin at stage 404 where top plate assembly 106 and middle frame assembly 108 may be pivoted away from bottom plate assembly 110. At stage 406 a carrier frame 402 may be placed on a first surface 408 of bottom plate assembly 110.

At stage 410 middle frame assembly 108 may be lowered such that locator clips 302 may engage carrier frame 402. Lowering of middle frame assembly 108 may position carrier frame 402 in the proper alignment. At stage 412 a PCAP display 416 may be place on middle frame assembly 108 and locator clips 302 may engage PCAP display 416. PCAP 416 may be properly aligned with carrier frame 402 upon placement of PCAP 416 in middle frame assembly 108. At stage 418 top plate assembly 106 may be lowered and secured to bottom plate assembly 110. Once top plate assembly 106 is secured to bottom plate assembly 110, vacuum pump 102 may be used to evacuate the air within cavity 112 via vacuum port 304.

Examples

Example 1 is a vacuum fixture comprising: a base plate assembly having a first hinged edge; a middle frame assembly connected to the base plate proximate the first hinged edge and defining a void; and a top plate assembly having a second hinged edge connected to the first hinged edge, such that when the top plate assembly is in a closed position the middle frame assembly is located in between and contacts a first surface of the base plate assembly and a first surface of the top plate assembly, thereby forming a cavity in between the base plate assembly and the top plate assembly.

In Example 2, the subject matter of Example 1 optionally includes a plurality of locator clips located along an interior perimeter of the middle frame assembly.

In Example 3, the subject matter of any one or more of Examples 1-2 optionally include at least one vacuum port passing into the cavity through the middle frame assembly.

In Example 4, the subject matter of Example 3 optionally includes a plurality of grippers located proximate the first surface of the top plate assembly and fluidly connected to the at least one vacuum port.

In Example 5, the subject matter of any one or more of Examples 1-4 optionally include at least one spring loaded float attached to the base plate assembly.

In Example 6, the subject matter of any one or more of Examples 1-5 optionally include at least one spring loaded float attached to the top plate assembly.

In Example 7, the subject matter of any one or more of Examples 1-6 optionally include a piston passing through a portion of the top plate and configured to exert a force on a moveable plate located proximate the first surface of the top plate assembly.

In Example 8, the subject matter of any one or more of Examples 1-7 optionally include a limit switch located proximate a perimeter of the top plate assembly and the base plate assembly when the top plate assembly is in the closed position.

In Example 9, the subject matter of any one or more of Examples 1-8 optionally include wherein the middle frame assembly is removably connected to the base plate assembly.

In Example 10, the subject matter of any one or more of Examples 1-9 optionally include wherein the middle frame assembly is hingedly connected to the middle frame assembly.

Example 11 is a vacuum fixture comprising: a base plate assembly having a first hinged edge; a top plate assembly having a second hinged edge connected to the first hinged edge; and a plurality of middle frame assemblies, each of the plurality of middle frame assemblies configured to connected to the base plate proximate the first hinged edge and defining a void, each of the plurality of middle frame assemblies being a different size, wherein when the top plate assembly is in a closed position one of the plurality of the middle frame assemblies is located in between and contacts a first surface of the base plate assembly and a first surface of the top plate assembly, thereby forming a cavity in between the base plate assembly and the top plate assembly.

In Example 12, the subject matter of Example 11 optionally includes wherein each of the middle frame assemblies is configured to hingedly connected to the middle frame assembly.

In Example 13, the subject matter of any one or more of Examples 11-12 optionally include wherein each of the middle frame assemblies includes at least one vacuum port.

In Example 14, the subject matter of any one or more of Examples 11-13 optionally include at least one spring loaded float attached to the base plate assembly.

Example 15 is a vacuum system comprising: a vacuum pump; and a vacuum fixture comprising: a base plate assembly having a first hinged edge and a plurality of spring loaded floats attached to a first surface of the base plate; a top plate assembly having a second hinged edge connected to the first hinged edge; and a middle frame assembly connected to the base plate proximate the first hinged edge and defining a void, the middle frame assembly defining a vacuum port in fluid communication with the vacuum pump, wherein when the top plate assembly is in a closed position the middle frame assembly is located in between and contacts the first surface of the base plate assembly and a first surface of the top plate assembly, thereby forming a cavity in between the base plate assembly and the top plate assembly.

In Example 16, the subject matter of Example 15 optionally includes a plurality of locator clips located along an interior perimeter of the middle frame assembly and projecting into the void.

In Example 17, the subject matter of any one or more of Examples 15-16 optionally include a plurality of grippers located proximate the first surface of the top plate assembly and fluidly connected to the vacuum port.

In Example 18, the subject matter of any one or more of Examples 15-17 optionally include a limit switch located proximate a perimeter of the top plate assembly and the base plate assembly when the top plate assembly is in the closed position.

In Example 19, the subject matter of any one or more of Examples 15-18 optionally include wherein the middle frame assembly is hingedly connected to the middle frame assembly.

In Example 20, the subject matter of any one or more of Examples 15-19 optionally include wherein the middle frame assembly is one of a plurality of middle frame assemblies, each of the middle frame assemblies being a different size.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

The invention claimed is:

1. A vacuum fixture comprising:
a base plate assembly having a first hinged edge;
a middle frame assembly connected to the base plate proximate the first hinged edge and defining a void; and
a top plate assembly having a second hinged edge connected to the first hinged edge, such that when the top plate assembly is in a closed position the middle frame assembly is located in between and contacts a first surface of the base plate assembly and a first surface of the top plate assembly, thereby forming a cavity in between the base plate assembly and the top plate assembly.

2. The vacuum fixture of claim 1, further comprising a plurality of locator clips located along an interior perimeter of the middle frame assembly.

3. The vacuum fixture of claim 1, further comprising at least one vacuum port passing into the cavity through the middle frame assembly.

4. The vacuum fixture of claim 3, further comprising a plurality of grippers located proximate the first surface of the top plate assembly and fluidly connected to the at least one vacuum port.

5. The vacuum fixture of claim 1, further comprising at least one spring loaded float attached to the base plate assembly.

6. The vacuum fixture of claim 1, further comprising at least one spring loaded float attached to the top plate assembly.

7. The vacuum fixture of claim 1, further comprising a piston passing through a portion of the top plate and configured to exert a force on a moveable plate located proximate the first surface of the top plate assembly.

8. The vacuum fixture of claim 1, further comprising a limit switch located proximate a perimeter of the top plate assembly and the base plate assembly when the top plate assembly is in the closed position.

9. The vacuum fixture of claim 1, wherein the middle frame assembly is removably connected to the base plate assembly.

10. The vacuum fixture of claim 1, wherein the middle frame assembly is hingedly connected to the middle frame assembly.

11. A vacuum fixture comprising:
a base plate assembly having a first hinged edge;
a top plate assembly having a second hinged edge connected to the first hinged edge; and
a plurality of middle frame assemblies, each of the plurality of middle frame assemblies configured to connected to the base plate proximate the first hinged edge and defining a void, each of the plurality of middle frame assemblies being a different size,
wherein when the top plate assembly is in a closed position one of the plurality of the middle frame assemblies is located in between and contacts a first surface of the base plate assembly and a first surface of the top plate assembly, thereby forming a cavity in between the base plate assembly and the top plate assembly.

12. The vacuum fixture of claim 11, wherein each of the middle frame assemblies is configured to hingedly connected to the middle frame assembly.

13. The vacuum fixture of claim 11, wherein each of the middle frame assemblies includes at least one vacuum port.

14. The vacuum fixture of claim 11, further comprising at least one spring loaded float attached to the base plate assembly.

15. A vacuum system comprising:
a vacuum pump; and
a vacuum fixture comprising:
a base plate assembly having a first hinged edge and a plurality of spring loaded floats attached to a first surface of the base plate;
a top plate assembly having a second hinged edge connected to the first hinged edge; and
a middle frame assembly connected to the base plate proximate the first hinged edge and defining a void, the middle frame assembly defining a vacuum port in fluid communication with the vacuum pump, wherein when the top plate assembly is in a closed position the middle frame assembly is located in between and contacts the first surface of the base plate assembly and a first surface of the top plate assembly, thereby forming a cavity in between the base plate assembly and the top plate assembly.

16. The vacuum system of claim 15, further comprising a plurality of locator clips located along an interior perimeter of the middle frame assembly and projecting into the void.

17. The vacuum system of claim 15, further comprising a plurality of grippers located proximate the first surface of the top plate assembly and fluidly connected to the vacuum port.

18. The vacuum system of claim 15, further comprising a limit switch located proximate a perimeter of the top plate assembly and the base plate assembly when the top plate assembly is in the closed position.

19. The vacuum system of claim 15, wherein the middle frame assembly is hingedly connected to the middle frame assembly.

20. The vacuum system of claim 15, wherein the middle frame assembly is one of a plurality of middle frame assemblies, each of the middle frame assemblies being a different size.

* * * * *